United States Patent
Lowder et al.

(10) Patent No.: US 9,837,784 B2
(45) Date of Patent: Dec. 5, 2017

(54) FULLY CONTROLLABLE BURST SHAPING INDIVIDUAL PULSES FROM PICOSECOND FIBER LASERS

(71) Applicant: nLIGHT, Inc., Vancouver, WA (US)

(72) Inventors: Tyson Lowder, Vancouver, WA (US); Timothy N. Kutscha, Portland, OR (US); Dennis McCal, Lake Oswego, OR (US); Timothy S. McComb, Portland, OR (US); Jared Green, Corbett, OR (US)

(73) Assignee: nLIGHT, Inc., Vancouver, WA (US)

( * ) Notice: Subject to any disclaimer, the term of this patent is extended or adjusted under 35 U.S.C. 154(b) by 0 days.

(21) Appl. No.: 15/392,925

(22) Filed: Dec. 28, 2016

(65) Prior Publication Data
US 2017/0187160 A1    Jun. 29, 2017

Related U.S. Application Data

(60) Provisional application No. 62/271,932, filed on Dec. 28, 2015.

(51) Int. Cl.
*H01S 3/30* (2006.01)
*H01S 3/067* (2006.01)
(Continued)

(52) U.S. Cl.
CPC .......... *H01S 3/06754* (2013.01); *B23K 26/06* (2013.01); *H01S 3/005* (2013.01);
(Continued)

(58) Field of Classification Search
CPC .. H01S 3/067; H01S 3/10084; H01S 3/10092; H01S 3/005; H01S 3/10046;
(Continued)

(56) References Cited

U.S. PATENT DOCUMENTS 5,632,916 A   5/1997 Lappalainen
5,817,243 A   10/1998 Shaffer
(Continued)

FOREIGN PATENT DOCUMENTS

WO   WO 2006/093378   9/2006
WO   WO 2012/121732   9/2012
WO   WO 2012/121733   9/2012

OTHER PUBLICATIONS

Deladurantaye et al., "Material micromachining using bursts of high repetition rate picosecond pulses from a fiber laser source," *Proc. of SPIE*, 7914:791404-1-791404-01 (Jan. 2011) (downloaded Sep. 18, 2013).

(Continued)

*Primary Examiner* — Kinam Park
(74) *Attorney, Agent, or Firm* — Klarquist Sparkman, LLP

(57) ABSTRACT

A pulse shaper includes a seed laser situated to emit laser pulses, an amplitude modulator situated to receive one or more laser pulse bursts from the seed laser, and a pulse signal generator situated to send a seed pulse signal with a predetermined delay to the seed laser so that the seed laser emits the laser pulses in one or more laser pulse bursts at a selected frequency with each laser pulse burst having a selected number of laser pulses and a selected temporal spacing between laser pulses in the laser pulse burst and situated to send an amplitude pulse signal so that the amplitude modulator adjusts the amplitude of at least one laser pulse in each laser pulse burst.

20 Claims, 6 Drawing Sheets

(51) Int. Cl.
*H01S 3/00* (2006.01)
*H01S 3/10* (2006.01)
*B23K 26/06* (2014.01)

(52) U.S. Cl.
CPC ............ *H01S 3/067* (2013.01); *H01S 3/1003* (2013.01); *H01S 3/10038* (2013.01); *H01S 3/10046* (2013.01); *H01S 3/10084* (2013.01); *H01S 3/10092* (2013.01); *H01S 3/0085* (2013.01)

(58) Field of Classification Search
CPC ............... H01S 3/06754; H01S 3/1003; H01S 3/10038; H01S 3/0085
See application file for complete search history.

(56) References Cited

U.S. PATENT DOCUMENTS

| | | | |
|---|---|---|---|
| 5,932,119 | A | 8/1999 | Kaplan et al. |
| 6,275,250 | B1 | 8/2001 | Sanders et al. |
| 6,590,183 | B1 | 7/2003 | Yeo |
| 6,738,396 | B2 | 5/2004 | Filgas et al. |
| 6,777,098 | B2 | 8/2004 | Yeo |
| 7,656,578 | B2 | 2/2010 | Galvanauskas et al. |
| 8,309,885 | B2 | 11/2012 | Peng et al. |
| 9,290,008 | B1 | 3/2016 | Li et al. |
| 2001/0030002 | A1 | 10/2001 | Zheng et al. |
| 2004/0095655 | A1 | 5/2004 | Owen |
| 2006/0065640 | A1 | 3/2006 | Lizotte et al. |
| 2006/0196858 | A1 | 9/2006 | Barron et al. |
| 2007/0240325 | A1 | 10/2007 | Pelsue et al. |
| 2007/0258149 | A1 | 11/2007 | Gardner et al. |
| 2009/0016388 | A1 | 1/2009 | Gu et al. |
| 2009/0046746 | A1 | 2/2009 | Munroe et al. |
| 2009/0225794 | A1 | 9/2009 | Liu |
| 2010/0183040 | A1 | 7/2010 | Ishizu et al. |
| 2011/0089067 | A1 | 4/2011 | Scott et al. |
| 2011/0193928 | A1 | 8/2011 | Zhang |
| 2011/0194574 | A1 | 8/2011 | Zhang et al. |
| 2011/0315667 | A1 | 12/2011 | Reichenbach |
| 2014/0300951 | A1* | 10/2014 | Messerly ............ H01S 3/06758 359/334 |
| 2016/0197451 | A1* | 7/2016 | Kraemer ............. H01S 3/10015 372/25 |

OTHER PUBLICATIONS

Final Office Action for related U.S. Appl. No. 13/236,949, dated Aug. 5, 2015, 14 pages.
Ng et al., "Aesthetic laser marking assessment using luminance ratios," *Optics and Lasers in Engineering,* 35:177-186 (Mar. 2001).
Notice of Allowance for related U.S. Appl. No. 13/236,949, dated Nov. 10, 2015, 9 pages.
Office Action for related U.S. Appl. No. 13/236,949, dated Nov. 20, 2014, 12 pages.
Saklakoglu et al., "Investigation of micro-milling processes parameters for surface roughness and milling depth," *The International Journal of Advanced Manufacturing Technology,* 54(5-8):567-578 (May 2011).

* cited by examiner

FULLY CONTROLLABLE BURST SHAPING INDIVIDUAL PULSES FROM PICOSECOND FIBER LASERS

CROSS REFERENCE TO RELATED APPLICATION

This application claims the benefit of U.S. Provisional Patent Application No. 62/271,932, filed Dec. 28, 2015, which is incorporated by reference herein in its entirety.

FIELD

The field is laser pulse burst shaping in fiber lasers.

BACKGROUND

Micromachining of materials with lasers has emerged as a disruptive technology in recent years. The quality of the machining process with the laser is typically dependent on several factors, including laser pulse duration, laser pulse repetition rate, laser pulse energy, and laser beam quality, with different machining processes often requiring variation of the aforementioned factors. Various micromachining processes seek to process target material as efficiently as possible without causing unwanted damage or defects. Lasers operating in a "burst" mode can provide packets of optical pulses where the pulses are spaced closely together to assist with the machining and processing of some materials. However, burst laser operation can be unstable and result in less than desirable results. Therefore, a need remains for improved burst mode operation.

SUMMARY

According to an example of the disclosed technology, a pulse shaper includes a seed laser situated to emit laser pulses, an amplitude modulator situated to receive one or more laser pulse bursts from the seed laser, and a pulse signal generator situated to send a seed pulse signal with a predetermined delay to the seed laser so that the seed laser emits the laser pulses in one or more laser pulse bursts at a selected frequency with each laser pulse burst having a selected number of laser pulses and a selected temporal spacing between laser pulses in the laser pulse burst and situated to send an amplitude pulse signal so that the amplitude modulator adjusts the amplitude of at least one laser pulse in each laser pulse burst.

In another example of the disclosed technology, a method of laser pulse shaping includes generating a pulse burst amplitude modulation signal based on a first pulse burst signal that is associated with a first clock signal, generating a seed pulse burst generation signal based on a second pulse burst signal that is associated with a second clock signal, generating at least one seed pulse burst based on the seed pulse burst generation signal, and modulating the amplitude of at least one seed pulse of the at least one seed pulse burst with the pulse burst amplitude modulation signal so as to form at least one corresponding amplitude modulated seed pulse.

In a further example of the disclosed technology, a pulsed fiber laser includes a seed laser, a controller coupled to the seed laser and operable to cause the seed laser to emit seed laser pulses in pulse bursts having pulse burst characteristics including a pulse burst frequency, a quantity of seed laser pulses in the pulse bursts, and a temporal spacing between the seed laser pulses in the pulse bursts, an acousto-optic modulator situated to receive and adjust the amplitude of at least one of the seed laser pulses in the pulse bursts so as to produce a corresponding amplitude adjusted seed laser pulse, and a fiber amplifier situated to receive and amplify the seed laser pulses received from the acousto-optic modulator.

The foregoing and other objects, features, and advantages will become more apparent from the following detailed description, which proceeds with reference to the accompanying figures.

DETAILED DESCRIPTION

Figure 1:
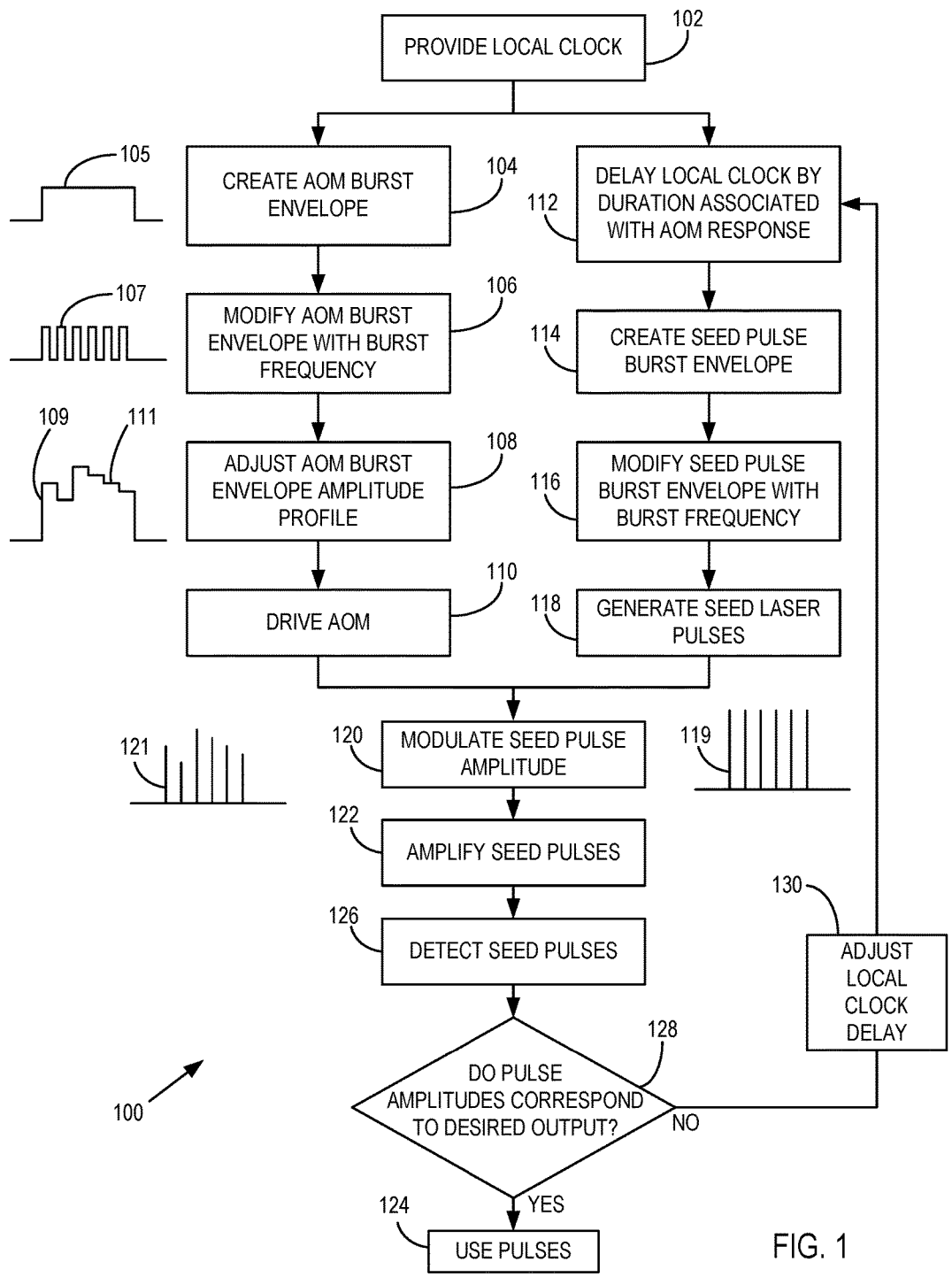
FIG. 1 is a flowchart of a method of pulse burst shaping.

As used in this application and in the claims, the singular forms "a," "an," and "the" include the plural forms unless the context clearly dictates otherwise. Additionally, the term "includes" means "comprises." Further, the term "coupled" does not exclude the presence of intermediate elements between the coupled items.

The systems, apparatus, and methods described herein should not be construed as limiting in any way. Instead, the present disclosure is directed toward all novel and non-obvious features and aspects of the various disclosed embodiments, alone and in various combinations and sub-combinations with one another. The disclosed systems, methods, and apparatus are not limited to any specific aspect or feature or combinations thereof, nor do the disclosed systems, methods, and apparatus require that any one or more specific advantages be present or problems be solved. Any theories of operation are to facilitate explanation, but the disclosed systems, methods, and apparatus are not limited to such theories of operation.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed systems, methods, and apparatus can be used in conjunction with other systems, methods, and apparatus. Additionally, the description sometimes uses terms like "produce" and "provide" to describe the disclosed methods. These terms are high-level abstractions of the actual operations that are performed. The actual operations that correspond to these terms will vary depending on the particular implementation and are readily discernible by one of ordinary skill in the art.

In some examples, values, procedures, or apparatus are referred to as "lowest", "best", "minimum," or the like. It will be appreciated that such descriptions are intended to indicate that a selection among many used functional alternatives can be made, and such selections need not be better, smaller, or otherwise preferable to other selections. Herein, various signals are described and can be provided with various communication paths, including with point-to-point wired paths as well as wirelessly, as well as through various topologies, such as serially, parallel, or ring connections.

Signals can be provided through conductive electronics, optical interconnects, or at radio or other frequencies, as convenient.

As used herein, optical pulses refers to electromagnetic radiation generated from laser sources at wavelengths of between about 100 nm and 10 µm, and typically between about 500 nm and 2 µm. Examples based on available laser diode sources and optical fibers generally are associated with wavelengths of between about 800 nm and 1700 nm. Representative embodiments are described with reference to optical fibers, but other types of optical waveguides can be used having square, rectangular, polygonal, oval, elliptical or other cross-sections, as well as free space couplings. Optical fibers are typically formed of silica (glass) that is doped (or undoped) so as to provide predetermined refractive indices or refractive index differences. In some examples disclosed herein, a waveguide core such as an optical fiber core is doped with a rare earth element such as Nd, Yb, Ho, Er, or other active dopants or combinations thereof. Such actively doped cores can provide optical gain in response to optical or other pumping. As disclosed below, waveguides having such active dopants can be used to form optical amplifiers, or, if provided with suitable optical feedback such as reflective layers, mirrors, Bragg gratings, or other feedback mechanisms, such waveguides can form optical oscillators and generate laser emissions. Optical pump radiation can be arranged to co-propagate and/or counter-propagate in the waveguide with respect to a propagation direction of an emitted laser beam or an amplified beam.

It has been found herein that operating a laser in a burst mode without influencing the shape of the packet or burst can result in pulses that are variable in peak power and energy due to the laser dynamics of the system. This variability can ultimately lead to inconsistency during material processing and poor results, including loss of product. This variability is overcome with different examples herein that can be capable of fully controlling the shape of pulse bursts with predetermined pulse amplitudes, pulse spacing, and pulse quantity for individual pulses of picosecond pulse fiber lasers.

Referring to FIG. 1, a method 100 is directed to generating laser seed pulses with predetermined characteristics. At a method act 102, a local clock signal is provided by a microcontroller unit, microprocessor, or other device. In some examples, an external clock may be provided. At a method act 104, an acousto-optic modulator (AOM) burst envelope (or gate) of a predetermined duration is created based on the local clock signal. The duration of the AOM burst envelope generally corresponds with a duration over which the AOM will modulate to adjust seed pulse characteristics. In some examples, the burst envelope has a longer duration so as to provide suitable flexibility for varying a pulse quantity or to provide other pulse burst variations, such as by providing a leading or trailing temporal buffer for alignment purposes or to interact with other components, such as pump sources or detection systems. One example of an AOM burst envelope 105 is shown adjacent to the method act 104. At a method act 106, the AOM burst envelope is modified with a burst frequency that is associated with a temporal duration between adjacent seed pulses in the burst envelope (e.g., a pulse period). One example of a modified AOM burst envelope 107 is shown adjacent to the method act 106 that includes six burst cycles of 20 ns duration at approximately 50% duty cycle. At a method act 108, the AOM burst envelope has an amplitude profile that is adjusted so as to correspond to different amplitudes for each seed pulse in the envelope. In one example, an amplitude-adjusted AOM burst envelope 109 includes six adjacent AOM levels of approximately 20 ns duration that correspond to the modulation of seed pulse characteristics. At a method act 110, the AOM is driven based on the modified and adjusted burst envelope.

In response to provision of the local clock signal at 102, in a method act 112, a predetermined delay associated with a response time of the AOM is applied to a copy of the (or the same) local clock signal. For example, an AOM response time can be on the order of 100s of ns due to acoustic delay and depending on the characteristics of the AOM, such as AOM sensitivity, and seed pulses propagating through the AOM, such as seed pulse diameter. In one example, an AOM response time was approximately 161 ns, and a corresponding predetermined delay was approximately the same. At a method act 114, a seed pulse burst envelope (or gate) is created based on the local clock signal and with an envelope duration that generally corresponds with the duration of the AOM burst envelope. In typical examples, the duration is shorter than a period of the local clock signal, though in some examples the duration is longer. In some embodiments, suitable envelope durations are on the order of less than a nanosecond to tens or hundreds of nanoseconds. At a method act 116, the seed pulse burst envelope is modified with a seed pulse burst frequency that generally corresponds with a pulse to pulse temporal spacing within the seed pulse burst envelope. At a method act 118, delayed seed pulses 119 are generated with a laser source, such as a diode laser, based on the modified seed pulse burst envelope, to form a seed pulse burst packet.

The driven AOM, at method act 110, and the delayed seed pulses 119 generated at method act 118 are synchronized by the predetermined delay applied at method act 112 so that the amplitudes of the delayed seed pulses 119 can be modulated at a method act 120. The modulated delayed seed pulses 121 typically do not experience significant rise time or fall time effects attributed to the AOM or other response time affecting components because the burst envelopes are digitally constructed based on the local clock signal and the delayed seed pulses 119 can become temporally aligned with the operation of the AOM. For example, delayed seed pulses 119 can be temporally spaced so as to be centered about or to have sufficient buffer duration in relation to edges of corresponding AOM pedestals 111. In some examples, delayed seed pulses 119 with a pulse to pulse temporal spacing of about 20 ns can be reliably produced and modulated even with various competing effects, such as seed pulse or AOM jitter, temporal misalignment of AOM and delayed seed signals, etc. Furthermore, the AOM modulation can operate to suppress amplified spontaneous emission between optical pulses and to provide further suppression through different AOM modulation levels, such as modulation to a low level between seed pulses.

At a method act 122, the modulated seed pulses 121 are amplified to a desired power level, such as with a fiber amplifier or other optical amplification system. Before the amplified seed pulses are used for various material applications at a method act 124, the amplified seed pulses can be detected at a method act 126, with a beam pickoff, such as a dichroic, by way of example. The detected pulses can be compared with a desired output at a compare block 128 and if they are suitable the pulses can be used at the method act 124. If a seed pulse amplitude error is detected at 128, the local clock delay applied at method act 112 can be adjusted at a method act 130 to correct the seed pulse amplitude error. For example, the AOM burst envelope 109 might not correctly correspond with the delayed generated seed pulses 119 causing first, last, or intermediate pulses in a pulse burst to have an incorrect amplitude (e.g., zero or maximum). With correct alignment between an AOM burst envelope (or AOM amplitudes within the AOM burst envelope) and the seed pulses of the seed pulse burst envelope, the temporal spacing between seed pulses, the number of seed pulses, and the amplitude of the seed pulses can be precisely controlled, allowing flexibility and precision in the shapes of the laser pulse bursts, including the peak power and energy of the pulses. This flexibility allows suitable or arbitrary profiles to be generated and used based on the particular requirements (e.g., material characteristics) of different micromachining processes or variation within a micromachining process. Thus, in some examples pulse burst amplitude profiles can be modified so that sequences of pulse bursts can have amplitude shape variation from pulse burst pulse burst.

Figure 2:
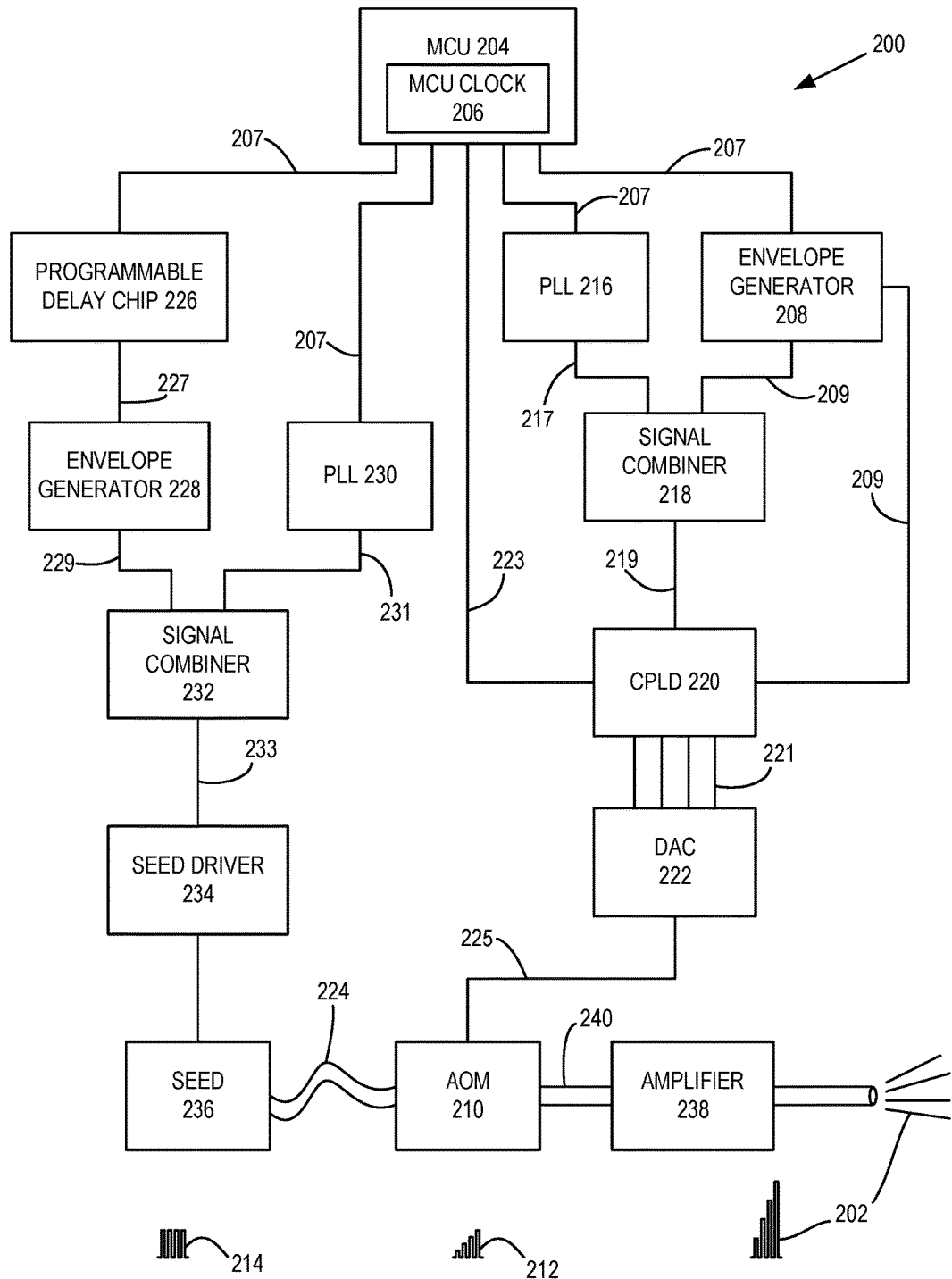
FIGS. 2-5 are schematics of laser pulse burst shaping systems.

FIG. 2 shows a pulse burst laser system 200 situated to generate amplified seed pulse bursts 202. A microcontroller (MCU) 204, or other logic device such as an FPGA, CPLD, discrete logic, etc., includes an MCU clock 206 providing a clock signal 207 having a predetermined frequency or frequencies. In some examples, the MCU clock 206 can be replaced with an external clock. The MCU clock 206 is coupled to an envelope generator 208 situated to generate an AOM burst envelope signal 209 having burst envelopes of a selected frequency and a selected duration associated with a duration over which an AOM 210 is modulated to one or more states so as to form amplitude adjusted seed pulse bursts 212 from unadjusted seed pulse bursts 214. In some examples, AOM burst envelopes are formed for each cycle of the clock signal 207, and the duration of the envelopes is substantially shorter than the period of the clock signal 207. However, it will be appreciated that various burst envelope durations are possible. A phase-locked loop (PLL) 216 is also situated to receive the clock signal 207 and provides a PLL output signal 217 of increased frequency based on the provided frequency of the clock signal 207 of the MCU clock 206. In one example, a 1.2 GHz PLL output signal is produced from a 20 MHz MCU clock signal.

A signal combiner 218 receives and combines the PLL output signal 217 with the generated AOM burst envelope signal 209 to form a modified AOM burst envelope signal 219 that includes a higher frequency burst of clocks during the envelope due to the PLL output signal 217. A complex programmable logic device (CPLD) 220, or other programmable logic device, such as an FPGA, MCU, ASIC, discrete logic, etc., is situated to receive the modified AOM burst envelope signal 219 and provides a digital output 221 to a digital analog converter (DAC) 222. The higher frequency burst of clocks of the modified AOM burst envelope signal 219 can be provided in a range of frequencies that are typically at or slower than the frequency of the PLL output signal 217, and can also be provided in the CPLD 220 based on the modified AOM burst envelope signal 219. The envelope signal 209 is also coupled to the CPLD 220 to reset the CPLD to a zero value after a reset duration. The digital output 221 can be pre-programmed or dynamically programmed over a control bus 223, such as serial, parallel, or other interface, coupled to the MCU so that a selected AOM modulation level is provided for each high frequency clock in the modified AOM burst envelope signal 219. An analog signal 225 produced by the DAC 222 is directed to the AOM 210 and the AOM 210 responds by providing an amplitude modulating effect on unadjusted seed pulse bursts 214 received by the AOM 210, such as through a connecting optical fiber 224.

The clock signal 207 is also provided to a programmable delay chip 226 which receives the clock signal 207 and adds a delay of a predetermined duration associated with the response time of the AOM 210 to form a delayed clock signal 227. An envelope generator 228 receives the delayed clock signal 227 and forms a seed pulse burst envelope signal 229. In some examples, the seed pulse burst envelope signal 229 is formed by adding a fixed duration seed pulse burst envelope to each cycle of the delayed clock signal 227 that is substantially shorter than the period of the clock signal 207. However, it will be appreciated that various burst envelope durations are possible. In some embodiments, the duration of the seed pulse burst envelope is the same as the duration of one or more of the AOM burst envelopes. A PLL 230 is situated to receive the clock signal 207 or the delayed clock signal 227 and to produce a PLL output signal 231 that is at a higher frequency than the frequency of the delayed clock signal 227. In typical examples, the higher frequency of the PLL output signal 231 is an integer multiple of the frequency of the delayed clock signal 227 and is the same as the higher frequency of the PLL output signal 217.

A signal combiner 232 receives the seed pulse burst envelope signal 229 and combines the PLL output signal 231 so as to form a modified seed pulse burst envelope signal 233 that includes the seed pulse burst envelope in which seed pulses are to be created and a higher frequency clock burst within the seed pulse burst envelope having a period duration associated with the higher frequency clock burst that corresponds to the individual seed pulses. The modified seed pulse burst envelope signal 233 is received by a seed driver 234 that is coupled to a seed laser 236. The seed driver 234 drives the seed laser 236, e.g., by generating a corresponding voltage or current so as to generate a corresponding laser pulse by the seed laser 236, based on the received seed pulse burst envelope signal 233 so that the seed pulse bursts 214 are produced at a selected frequency and the seed pulses are produced at a selected frequency within the seed pulse bursts 214. The AOM 210 receives the unadjusted seed pulse bursts 214 and adjusts the amplitude of the seed pulses in each seed pulse burst to form amplitude adjusted seed pulse bursts 212. The amplitude adjusted seed pulse bursts 212 are coupled to an optical amplifier 238, such as through a connecting optical fiber 240, and the amplified seed pulse bursts 202 are formed. The amplified seed pulse bursts 202 can then be directed to a target, such as for materials processing, or other optical components, such as additional optical amplifiers, nonlinear optical crystals, etc. In some examples, one or more amplifiers can be situated before the AOM 210.

Figure 3:
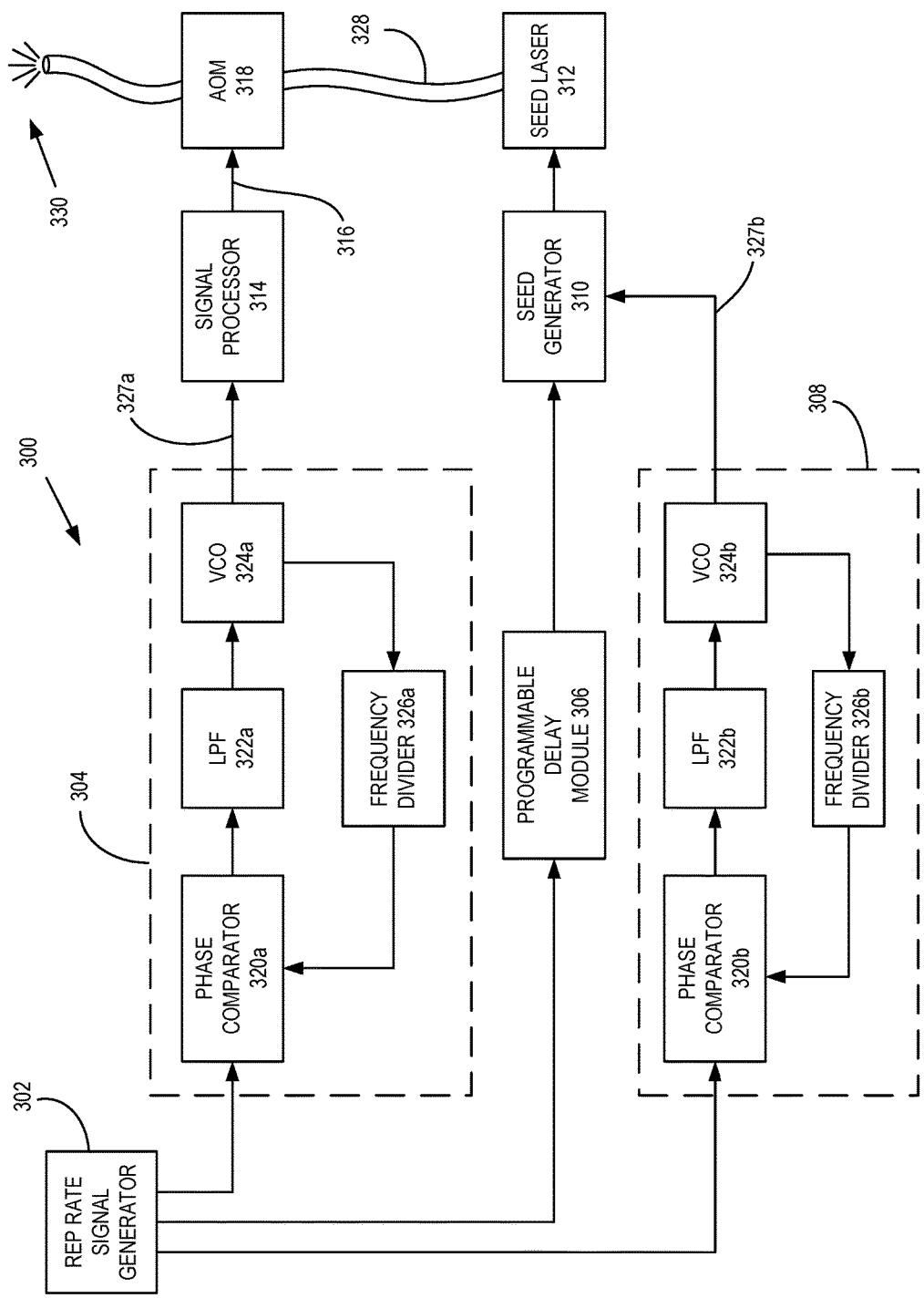

FIG. 3 shows a pulse shaping system 300 that includes a rep rate signal generator 302 that can be of various types, including computer hardware provided clock signal generators, by way of example. The generated rep rate signal is coupled to a first PLL 304, a programmable delay module 306, and a second PLL 308. The programmable delay module 306 and the second PLL 308 are coupled to a seed generator 310 that forms seed pulses and drives a seed laser 312. In some examples, the second PLL 308 does not have identical characteristics to the first PLL 304. The programmable delay module 306 typically provides a delay duration that is associated with a response time of an AOM 318. The first PLL 304 is coupled to a signal processor 314 that provides a seed pulse modulation signal 316 to the AOM 318. The AOM 318 is then operable to modulate an amplitude, or optical intensity, of optical pulses that propagate through it in accordance with the seed pulse modulation signal 316.

The first and second PLLs 304, 308 include phase comparators 320a, 320b, low-pass filters 322a, 322b, voltage controlled oscillators 324a, 324b, and frequency dividers 326a, 326b. The respective phase comparator 320a, 320b compares a phase between the input rep rate signal and a phase received from the respective frequency dividers 326a, 326b and produce a voltage output to the respective low-pass filters 322a, 322b. The respective low-pass filters 322a, 322b prevent instabilities and reduce noise in the phase-locked loops 304, 308 and provide filtered voltage signals to the voltage controlled oscillators 324a, 324b. The voltage controlled oscillators 324a, 324b typically operate as an integrator, converting the filtered voltage signals to respective higher frequency outputs 327a, 327b based on an integer associated with the frequency dividers 326a, 326b. The signal processor 314 receives the higher frequency output 327a and controls the AOM 318 to modulate at a higher frequency than the frequency of the rep rate signal. The seed generator 310 receives the higher frequency output 327b and drives the seed laser 312 to produce seed pulses at a higher frequency than the frequency of the rep rate signal.

The seed pulses generated by the seed laser 312 are coupled to the AOM 318 with an optical fiber 328 or other suitable optical coupling and the AOM 318 is modulated to adjust the amplitude of the seed pulses propagating past the AOM 318. By using the rep rate signal and the programmable delay module 306 coupled to the PLL 308 to produce seed pulses with a short and selectable temporal spacing and using the rep rate signal without the programmable delay module 306 and coupled to the PLL 304 to produce a corresponding AOM modulation, a fully controllable amplitude adjustment of the generated seed pulses can be performed, even when the duration of the delay provided by the programmable delay module 306 is substantially longer than a period between seed pulses that is associated with the higher frequency of the PLLs 304, 308. Thus, seed pulses 330 are created with a predetermined temporal spacing and amplitude for subsequent optical amplification or other use. In some examples, a rise time and fall time, typically associated with a modulation of the seed pulses, is absent due to the signal alignment between the AOM 318 and seed laser 312.

Figure 4:
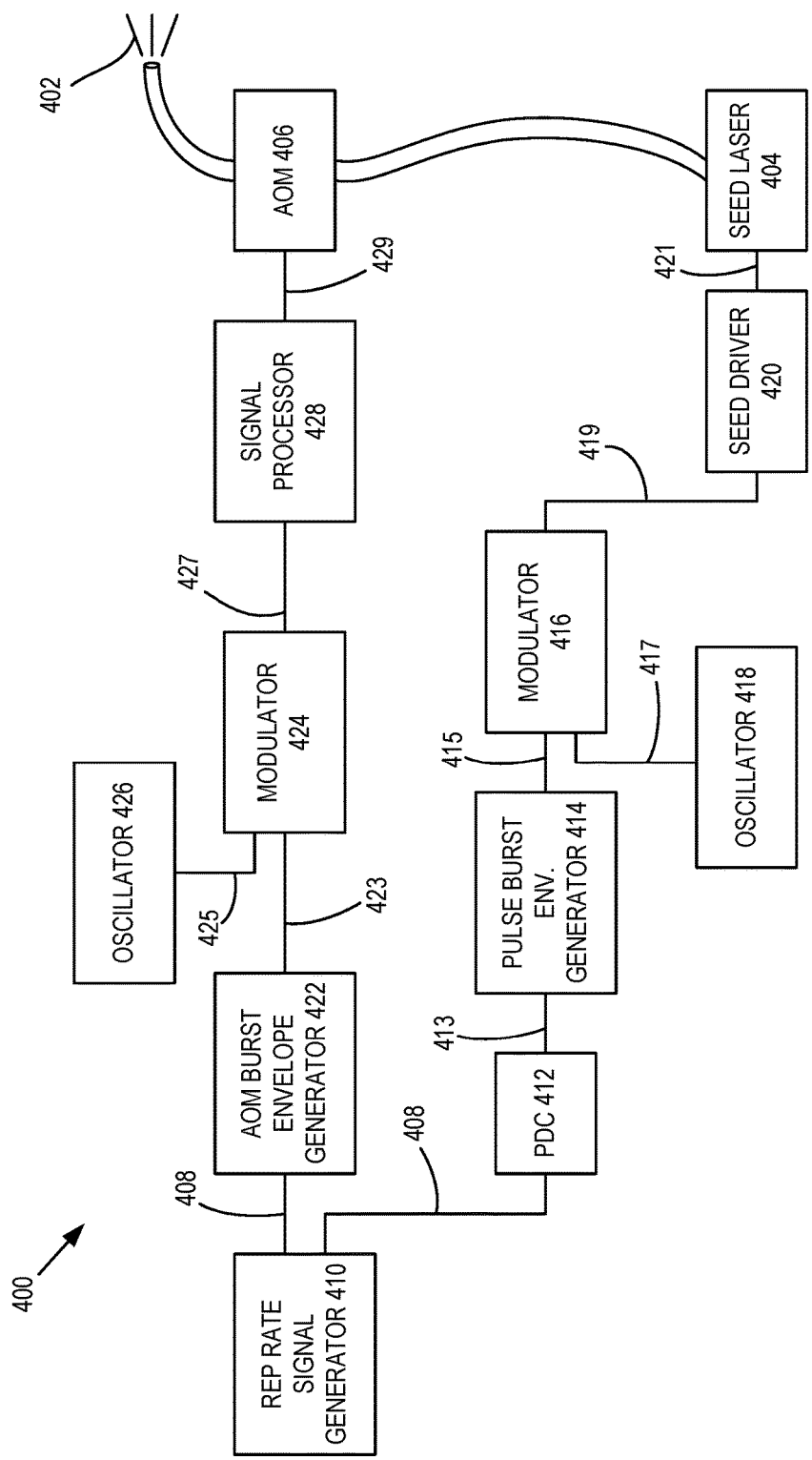

In FIG. 4, a pulse shaping system 400 generates bursts of optical seed pulses 402 with a seed laser 404 that are amplitude modulated with an AOM 406, with seed pulse generation and amplitude modulation of the seed pulses being based on a signal 408 from a rep rate signal generator 410 that has a predetermined frequency and corresponding period. A programmable delay chip (PDC) 412 receives the signal 408 having predetermined frequency and period and adds a predetermined time delay to form a delayed signal 413. A pulse burst envelope generator 414 receives the delayed signal 413 and produces a pulse burst envelope of a selected duration typically at the beginning of the period of the delayed signal 413 to form a delayed pulse burst envelope signal 415. A modulator 416, such as a multiplier, receives the delayed pulse burst envelope signal 415 and adds a high frequency component 417 from an oscillator 418 so as to form a modified delayed pulse burst envelope signal 419 that provides the generation of a plurality of seed pulses within the envelope that are spaced by a period that is the same or of longer duration as compared to a period associated with the high frequency component 417. A seed driver 420 receives the modified delayed pulse burst envelope signal 419 and drives a voltage or current 421 of the seed laser 404 so that seed pulses are generated that correspond to the periods and frequencies associated with the modified delayed pulse burst envelope signal 419.

An AOM burst envelope generator 422 receives the signal 408 and adds an AOM burst envelope that generally corresponds with the duration of the pulse burst envelope of the delayed pulse burst envelope signal 413 to form an AOM burst envelope signal 423. A modulator 424 that can be the same or different from modulator 416 receives the AOM burst envelope signal 423 and adds a high frequency component 425 from an oscillator 426 so as to form a modified AOM burst envelope signal 427 that provides for individual durations within the envelope that are spaced by a period that is the same or longer than a period associated with the high frequency component 425. A signal processor 428 receives the modified AOM burst envelope signal 427 and applies separate AOM modulation amplitudes to the individual durations within the envelope so as to produce an amplitude adjusted AOM burst envelope signal 429. The AOM 406 receives the amplitude adjusted AOM burst envelope signal 429 and, due to the delay provided by the PDC 412, drives the AOM to adjust the amplitude of seed pulses received from the seed laser 404 so as to produce the optical seed pulses 402.

Figure 5:
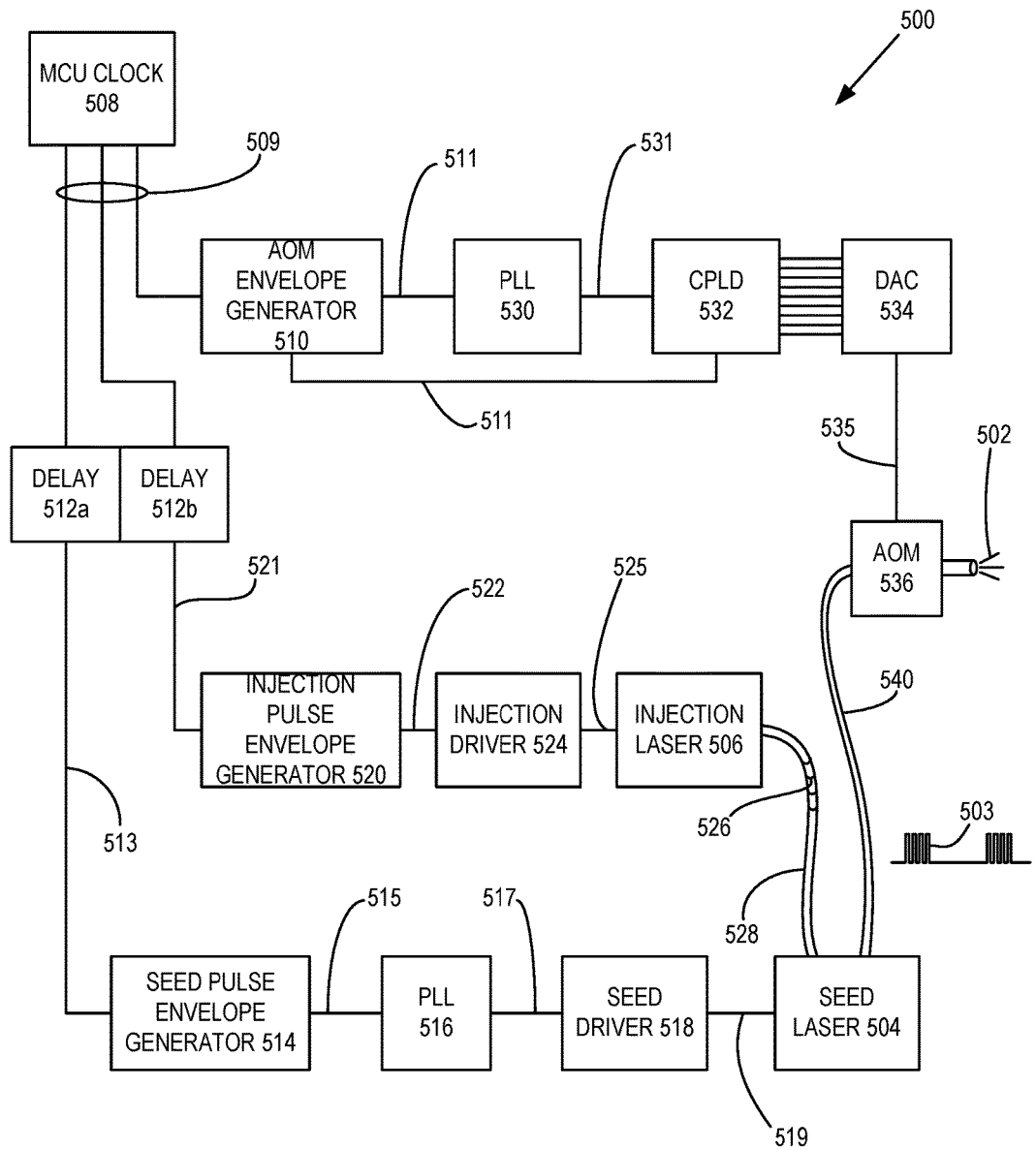

FIG. 5 depicts a laser pulse generation system 500 that produces amplitude modulated optical pulse bursts 502 from a seed laser 504 and injection laser 506. An MCU 508 provides a clock signal 509 with a predetermined clock frequency to an AOM envelope generator 510 and first and second signal delayers 512a, 512b. A seed pulse envelope generator 514 receives a delayed clock signal 513 and forms a seed pulse envelope signal 515 having a square signal envelope at the initiation of each cycle or of selected cycles of the predetermined clock frequency and during which optical seed laser pulses will be generated. A PLL 516 receives the seed pulse envelope signal 515 and forms a seed pulse burst envelope signal 517 by adding a burst of clocks at a higher clock frequency than the predetermined clock frequency of the clock signal 509, with the higher clock frequency providing a temporal spacing within the seed pulse envelope for the generation of a plurality of optical seed pulses forming a seed pulse burst 503. A seed driver 518 converts the seed pulse burst envelope signal 517 to a corresponding regulated voltage or current signal 519 that drives the seed laser 504.

An injection pulse envelope generator 520 receives a delayed clock signal 521 that can be the same as or different from the delayed clock signal 513. An injection pulse envelope signal 522 is formed with injection pulse envelopes that can have the same duration or a different duration compared to the seed pulse envelopes of the seed pulse envelope signal 515. In some examples, the delayed clock signal 521 can have a shorter delay than the delayed clock signal 513 to account for seed laser dynamics as well as a variable delay in relation to the delayed clock signal 513 which can also be variable. An injection pulse driver 524 converts the injection pulse envelope signal 522 to a suitable voltage or current signal 525 that drives the injection laser 506 to generate injection laser pulses 526 corresponding to the injection pulse envelope signal 522. The injection laser pulses 526 are coupled to the seed laser 504 with an optical fiber coupling system 528 and the injection laser pulses 526 are synchronized with the generation of the seed pulse bursts 503. The coupled injection laser pulses 526 are configured to narrow the wavelength of the pulses of the seed pulse bursts 503 and to reduce optical noise.

The AOM envelope generator 510 receives the clock signal 509 without a corresponding clock delay provided by the signal delay generators 512a, 512b and forms an AOM envelope signal 511 with an AOM envelope duration that corresponds to the seed pulse envelope duration of the seed pulse envelope signal 515. In some embodiments, the AOM envelope duration can be shorter or longer than the seed pulse envelope duration. A PLL 530 receives the AOM envelope signal 511 and provides a temporal spacing within each AOM envelope for different AOM amplitudes with the number of temporal spacings corresponding to the number of optical seed pulses in the seed pulse bursts 503. A CPLD 532, or other logic module, such as an FPGA or discrete logic, receives from the PLL 530 an AOM burst envelope signal 531 with the corresponding temporal spacings and modifies the amplitude of each temporal spacing in each envelope to one or more predetermined levels. The AOM envelope signal 511 is also coupled to the CPLD 532 to reset the CPLD 532 to a zero or default value in relation to a termination of an AOM envelope. The different predetermined levels are digitally communicated with a parallel bus to a DAC 534 which converts the amplitude data to an analog AOM input signal 535 that is coupled to the AOM 536 which is situated to modulate optical pulse amplitudes. The AOM 536 receives the seed pulse bursts 503 through an optical coupling system 540, such as an optical fiber or through free space, and modulates the amplitude of the individual optical pulses within each seed pulse burst to the predetermined amplitudes so as to produce the amplitude modulated optical pulse bursts 502.

Figure 6:
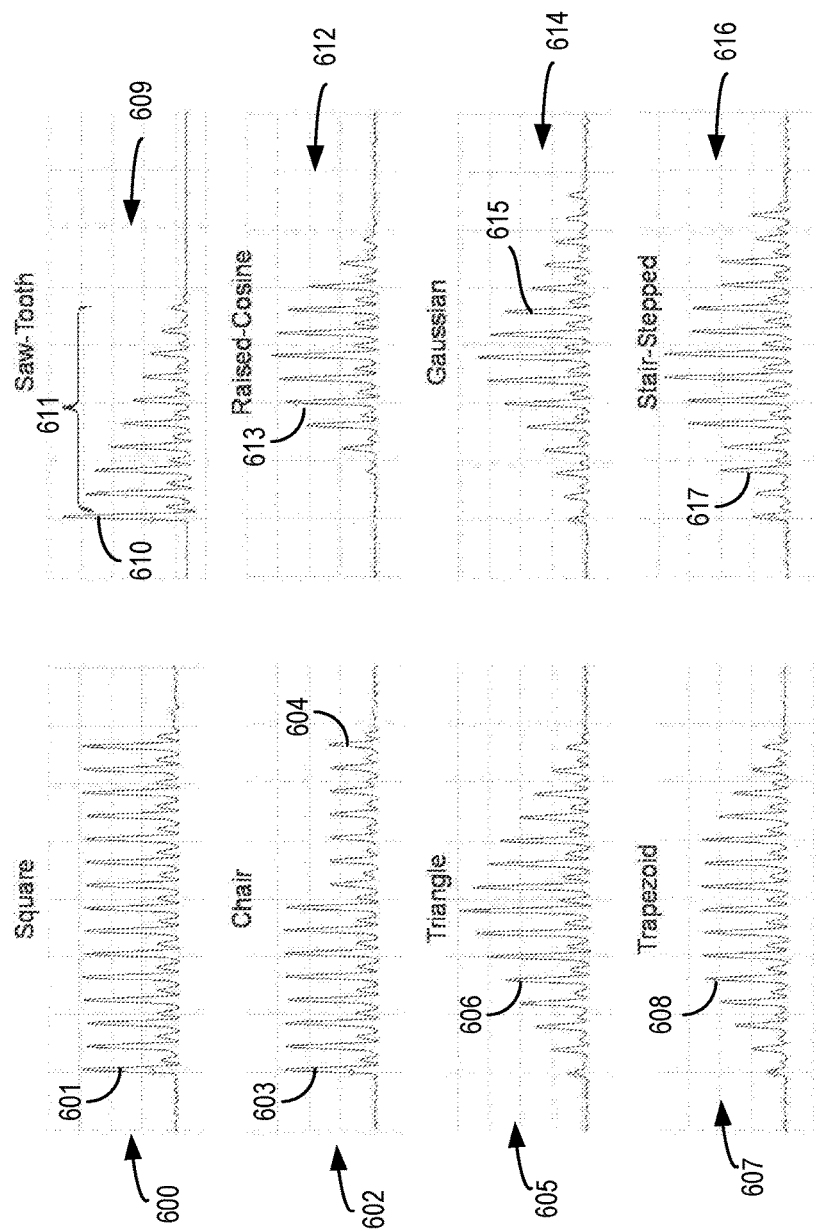
FIG. 6 shows shaped laser pulse burst examples.

FIG. 6 includes shapes of pulse bursts according to different embodiments. A square pulse burst 600 including fifteen approximately 50 ps amplitude modulated seed pulses 601 temporally spaced from each other by about 20 ns. A chair-shaped pulse burst 602 includes eight seed pulses 603 modulated to a first amplitude and seven seed pulses 604 modulated to a second amplitude lower than the first amplitude. A triangle pulse burst 605 fifteen seed pulses 606 amplitude modulated to form a triangle shape through the duration of the pulse burst 605. A trapezoidal pulse burst 607 includes fifteen seed pulses 608 symmetrically arranged in a trapezoid shape. A reverse saw-tooth pulse burst 609 includes a first seed pulse 610 with a maximum amplitude and nine subsequent pulses 611 with successively lower amplitudes. A raised-cosine shaped pulse burst 612 includes eleven symmetrically arranged seed pulses 613 in the form of a cosine function. A Gaussian shaped pulse burst 614 includes a fifteen seed pulses 615 symmetrically arranged in the form of a Gaussian function. A stair-stepped pulse burst 616 includes seven pairs of seed pulses 617, with each pulse in a pair having approximately the same amplitude, symmetrically arranged in a stair-step shape. Pulse bursts can include a range of seed pulses in a pulse burst, including a variable number of seed pulses between temporally adjacent pulse bursts. Seed pulses within pulse bursts can be arranged symmetrically or asymmetrically and amplitudes can vary between a maximum amplitude and a zero amplitude multiple times within a pulse burst. Temporal spacings between pulses and pulse durations can be selected or changed for different applications. As shown in FIG. 6, pulse widths appear to be longer than 50 ps due to oscilloscope detection resolution. Similarly, side lobes shown adjacent to laser pulses are not actually present and are instead an artifact of oscilloscope detection resolution.

Having described and illustrated the principles of the disclosed technology with reference to the illustrated embodiments, it will be recognized that the illustrated embodiments can be modified in arrangement and detail without departing from such principles. For instance, elements of the illustrated embodiments shown in software may be implemented in hardware and vice-versa. Also, the technologies from any example can be combined with the technologies described in any one or more of the other examples. It will be appreciated that procedures and functions such as those described with reference to the illustrated examples can be implemented in a single hardware or software module, or separate modules can be provided. As an example, a PLL may be included in an MCU, a CPLD, an FPGA, or in a separate component. Other pulse shaping system components, such as signal combiners, envelope generators, delay modules, analog or digital converters, signal processors, signal sources, controllers, oscillators, etc., can have similar flexibility. The particular arrangements above are provided for convenient illustration, and other arrangements can be used.

Various parts of pulse shaping methods may be, for example, embodied as software or firmware instructions carried out by a digital computer. For instance, any of the disclosed pulse burst signal formations and modifications can be performed by a computer or other computing hardware (e.g., an ASIC or FPGA) that is part of a pulse shaping system. The computer can be a computer system comprising one or more processors (processing devices) and tangible, non-transitory computer-readable media (e.g., one or more optical media discs, volatile memory devices (such as DRAM or SRAM), or nonvolatile memory or storage devices (such as hard drives, NVRAM, and solid state drives (e.g., flash drives)). The one or more processors can execute computer-executable instructions stored on one or more of the tangible, non-transitory computer-readable media, and thereby perform various portions of the disclosed techniques. For instance, software for performing any of the disclosed embodiments can be stored on the one or more volatile, non-transitory computer-readable media as computer-executable instructions, which when executed by the one or more processors, cause the one or more processors to perform various portions of the disclosed pulse shaping techniques. The results of the computations can be stored (e.g., in a suitable data structure or lookup table) in the one or more tangible, non-transitory computer-readable storage media and/or can also be output to the user, for example, by displaying, on a display device, pulse shaping characteristics, such as pulse burst amplitude profiles, with a graphical user interface.

In view of the many possible embodiments to which the principles of the disclosed technology may be applied, it should be recognized that the illustrated embodiments are only representative examples and should not be taken as limiting the scope of the disclosure. Alternatives specifically addressed in these sections are merely exemplary and do not constitute all possible alternatives to the embodiments described herein. For instance, various components of systems described herein may be combined in function and use. We therefore claim all that comes within the scope and spirit of the appended claims.

We claim:

1. An apparatus, comprising:
a seed laser;
an amplitude modulator situated to receive one or more laser pulse bursts from the seed laser; and
a pulse signal generator situated to couple a seed pulse signal with a predetermined delay to the seed laser so that the seed laser emits laser pulses in the one or more laser pulse bursts at a selected frequency, each laser pulse burst having a selected number of laser pulses and a selected temporal spacing between laser pulses, and to couple a pulse amplitude signal to the amplitude modulator so that the amplitude modulator adjusts an amplitude of at least one laser pulse in each of the one or more laser pulse bursts.

2. The apparatus of claim 1, wherein the pulse signal generator includes a clock burst generator situated to generate a clock burst associated with the seed pulse signal.

3. The apparatus of claim 2, wherein the clock burst generator includes a phase locked loop operable to generate a clock burst frequency by phase-locking a voltage controlled oscillator signal to a reference signal.

4. The apparatus of claim 3, wherein the reference signal is supplied by an internal clock of the pulse signal generator.

5. The apparatus of claim 2, wherein the pulse signal generator includes a programmable delay operable to provide the predetermined delay to the seed pulse signal coupled to the seed laser so as to synchronize amplitude adjustment of the one or more laser pulse bursts.

6. The apparatus of claim 5, wherein the predetermined delay is greater than or equal to 50 ns and less than or equal to 200 ns.

7. The apparatus of claim 1, further comprising an optical power amplifier situated to receive and amplify the amplitude adjusted one or more laser pulse bursts.

8. The apparatus of claim 1, wherein the selected laser pulse burst frequency is greater than or equal to 1 kHz and less than or equal to 100 MHz, the selected number of laser pulses is greater than or equal to 2 and less than or equal to 50, and the selected temporal spacing is greater than or equal to 1 ns and less than or equal to 1 µs.

9. The apparatus of claim 1, wherein the amplitude modulator is an acousto-optic modulator.

10. The apparatus of claim 1, wherein the pulse amplitude signal is a digital signal, and further comprising:
a programmable logic device situated to provide the pulse amplitude signal with a variable amplitude profile; and
a digital-analog converter situated to receive the digital pulse amplitude pulse signal with the variable amplitude profile and to convert the pulse amplitude signal to an analog pulse amplitude signal that is coupled to the amplitude modulator.

11. A method of laser pulse shaping, comprising:
generating a pulse burst amplitude modulation signal based on a first pulse burst signal that is associated with a first clock signal;
generating a seed pulse burst generation signal based on a second pulse burst signal that is associated with a second clock signal;
generating at least one seed pulse burst based on the seed pulse burst generation signal; and
modulating an amplitude of at least one seed pulse of the at least one seed pulse burst with the pulse burst amplitude modulation signal so as to form at least one corresponding amplitude modulated seed pulse.

12. The method of claim 11, wherein the second clock signal corresponds to the first clock signal delayed by a predetermined duration associated with an amplitude modulator response time.

13. The method of claim 11, further comprising amplifying the at least one amplitude modulated seed pulse.

14. The method of claim 11, wherein the first pulse burst signal includes a temporal spacing associated with pulses in a pulse burst envelope, and wherein the temporal spacing is associated with a frequency division provided by a phase locked loop coupled to the first clock signal.

15. The method of claim 11, further comprising driving a programmable logic device and digital analog converter with the pulse burst amplitude modulation signal.

16. The method of claim 11, wherein the modulating the amplitude of the at least one seed pulse is provided by an acousto-optic modulator.

17. The method of claim 11, wherein the first clock signal and the second clock signal are provided with a microcontroller unit and the delay of the second clock signal is provided by a programmable delay chip.

18. A pulsed fiber laser, comprising:
a seed laser;
a controller coupled to the seed laser and operable to cause the seed laser to emit seed laser pulses in pulse bursts having pulse burst characteristics including a pulse burst frequency, a quantity of seed laser pulses in the pulse bursts, and a temporal spacing between the seed laser pulses in the pulse bursts;
an acousto-optic modulator situated to receive and adjust an amplitude of at least one of the seed laser pulses in the pulse bursts so as to produce corresponding amplitude adjusted seed laser pulse bursts; and
a fiber amplifier situated to receive and amplify the amplitude adjusted seed laser pulse bursts received from the acousto-optic modulator.

19. The pulsed fiber laser of claim 18, wherein the controller includes a pulse signal generator situated to generate a pulse signal corresponding to the pulse burst characteristics;
wherein the amplitude adjustment provided by the acousto-optic modulator is synchronized in relation to the pulse signal;
wherein the pulse signal is coupled to a delay module so as to produce a delayed clock signal and the seed laser emits the seed laser pulses based on the delayed clock signal.

20. The pulsed fiber laser of claim 19, wherein the controller includes programmable logic situated modify the pulse signal in relation to a pulse burst amplitude profile and a digital-analog converter situated to send to the acousto-optic modulator the pulse signal modified according to the pulse burst amplitude profile.

* * * * *